(12) United States Patent
Kim et al.

(10) Patent No.: US 8,948,790 B1
(45) Date of Patent: Feb. 3, 2015

(54) APPARATUS AND METHOD FOR VEHICLE INTERIOR ZONE-BASED PREVENTION OF A DANGEROUS USER BEHAVIOR WITH A MOBILE COMMUNICATION DEVICE

(71) Applicants: Christine Hana Kim, San Jose, CA (US); Samuel Seungmin Cho, Fremont, CA (US)

(72) Inventors: Christine Hana Kim, San Jose, CA (US); Samuel Seungmin Cho, Fremont, CA (US)

( * ) Notice: Subject to any disclaimer, the term of this patent is extended or adjusted under 35 U.S.C. 154(b) by 19 days.

(21) Appl. No.: 13/676,066

(22) Filed: Nov. 13, 2012

(51) Int. Cl.
*H04W 24/00* (2009.01)
*H04W 4/00* (2009.01)

(52) U.S. Cl.
CPC .................... *H04W 4/008* (2013.01)
USPC ...... 455/456.4; 455/41.1; 455/41.2; 455/411; 455/456.1

(58) Field of Classification Search
USPC .................. 455/411, 456.1, 456.4, 41.1, 41.2
See application file for complete search history.

(56) References Cited

U.S. PATENT DOCUMENTS

| 2004/0203895 | A1* | 10/2004 | Balasuriya | 455/456.1 |
|---|---|---|---|---|
| 2006/0234703 | A1* | 10/2006 | Wuthnow et al. | 455/433 |
| 2007/0032225 | A1* | 2/2007 | Konicek et al. | 455/417 |
| 2007/0111714 | A1* | 5/2007 | Edwards | 455/415 |
| 2010/0102928 | A1* | 4/2010 | Chang | 340/5.72 |
| 2011/0177797 | A1* | 7/2011 | Vendrow et al. | 455/414.1 |
| 2012/0313750 | A1* | 12/2012 | Au et al. | 340/5.61 |

* cited by examiner

*Primary Examiner* — Mehmood B Khan
(74) *Attorney, Agent, or Firm* — Invent Capture, LLC.; Samuel S. Cho

(57) ABSTRACT

Various embodiments of an apparatus and a method prevent a dangerous user behavior with a mobile communication device by embedding RFID tags in a vehicle's interior space and by interrogating those embedded RFID tags with an integrated RFID tag reader in the mobile communication device. In one embodiment of the invention, the vehicle's interior space is divided into multiple "zones," at least one of which is defined as a "driving lock" zone. A vehicle interior zone is identifiable with an embedded RFID tag with a particular tag readable range, which only extends to the boundary of that particular zone. Therefore, a mobile communication device with an integrated RFID tag reader can recognize which zone the mobile communication device is currently in by accessing an RFID tag embedded nearby, and then proceed to enable the driving lock on the mobile communication device, if necessary.

16 Claims, 10 Drawing Sheets

100

301

303

300

APPARATUS AND METHOD FOR VEHICLE INTERIOR ZONE-BASED PREVENTION OF A DANGEROUS USER BEHAVIOR WITH A MOBILE COMMUNICATION DEVICE

BACKGROUND OF THE INVENTION

The present invention generally relates to a portable electronic device and a vehicle. More specifically, the present invention relates to an apparatus and a method for vehicle interior zone-based prevention of a dangerous user behavior with a mobile communication device.

In recent years, driver distraction related to mobile communication devices has become a serious concern for public safety. Some drivers who attempt to send text messages or to browse the Internet while driving have caused serious vehicle accidents, thereby prompting some local, state, and national governments to enact regulations to restrict the use of mobile communication devices for drivers. For example, some local, state, and national governments are beginning to impose regulations to make Bluetooth-based voice calls mandatory for drivers. Limiting or prohibiting the use of text messages and Internet browsers from the mobile communication device while driving may also become important aspect of regulatory measures to reduce driver distraction and to enhance public safety.

Furthermore, in recent years, a modern cellular phone or a similar mobile communication device has evolved into a versatile portable computing device for many consumers. For example, cellular phones, such as "smart phones" or "feature phones," are capable of browsing the Internet and communicate with other users by text or multimedia messages. Modern cellular phones and other mobile communication devices are also capable of executing mobile application software to provide a variety of versatile mobile computing experiences to consumers. While modern cellular phones still serve their original purpose as voice communication devices, Internet browsing, text messaging, mobile application software usage, and other multimedia functions are increasingly becoming critical and essential aspects of the user experience for mobile communication.

Unfortunately, the increasing popularity of Internet browsing, text messaging, mobile application software usage, and other multimedia functions on a cellular phone or on another mobile communication device has also increased the chances of a user distraction and/or a careless self-endangerment during an attention-requiring user activity, such as driving, walking, and jogging. A driver interacting or fumbling with a cellular phone or another mobile communication device while driving may cause serious self-endangerment as well as public endangerment, because the driver may run over a pedestrian, another vehicle, or an object while being distracted by the mobile communication device.

In some situations, parents who are concerned about the physical safety of their teenaged children may want to restrict, prohibit, and/or limit the usage of certain device features while their teenaged children are engaged in attention-requiring activity such as driving, walking, and jogging. Similarly, an employer wanting to enforce certain cellular phone-related or mobile communication device-related safety and legal compliance guidelines against a highly-mobile employee (e.g. a deliveryman, a bus driver, a truck driver, a salesman, and etc.) may want to prevent, prohibit, and/or limit the usage of certain device features while the employee is on duty for driving a vehicle.

Conventional methods and apparatuses for limiting the use of a mobile communication device in a vehicle include disabling the mobile communication device based on global positioning system (GPS) signals, or based on an actively-powered aftermarket apparatus in the vehicle that disables the mobile communication device if the vehicle's engine is running. However, these conventional methods and apparatuses are generally inaccurate and/or impractical to utilize in numerous situations. For example, a GPS-based disablement of the mobile communication device is subject to a serious level of inaccuracy and inconvenience, as the GPS-based disablement does not distinguish the situation between a driver behind the wheel and a commuter in a bus, a carpool, or another method of public transit. Therefore, the GPS-based disablement of device features and functions can unnecessarily and inconveniently disable a mobile communication device even if the user is in public transit. This problem is particularly cumbersome if the GPS-based disablement of devices is controlled and managed by a supervising entity for a plurality of employees' mobile communication devices.

Furthermore, an actively-powered aftermarket apparatus in a vehicle that disables mobile communication devices cannot distinguish a driver's mobile communication device from other passengers' mobile communication devices in the vehicle, thereby inconveniencing the passengers in the vehicle if the actively-powered aftermarket apparatus is used. In addition, a passenger in the vehicle is also unable to use the driver's mobile communication device in this conventional method.

Therefore, a highly-effective, convenient, and accurate apparatus and a related method that can prevent, prohibit, and/or limit a dangerous user behavior with a mobile communication device to reduce user distraction may be highly beneficial to device users and/or their supervising entities, such as parents or employers. Furthermore, an apparatus and a related method that can prevent, prohibit, and/or limit certain device features based on a particular location of a vehicle interior zone may also be beneficial to device users and/or their supervising entities. In addition, an apparatus and a related method that can authenticate and authorize a supervising entity to enable or disable certain device features while a mobile communication device user is driving or performing another attention-requiring activity may also be highly beneficial.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for vehicle interior zone-based prevention of a dangerous user behavior with a mobile communication device is disclosed. The apparatus comprises an RFID tag embedded in a vehicle's interior space, wherein a tag readable range of the RFID tag defines a driving lock zone in the vehicle's interior space; an integrated RFID tag reader in the mobile communication device, wherein the integrated RFID tag reader is configured to interrogate, read from, and/or write to a non-volatile memory storage unit inside the RFID tag; a CPU operatively connected to the integrated RFID tag reader inside a casing of the mobile communication device; a memory unit operatively connected to the CPU and also operatively connected to the integrated RFID tag reader; and a software program executed on the CPU and the memory unit of the mobile communication device, wherein the software program retrieves a code from the RFID tag using the integrated RFID tag reader, and then compares the code against a known set of information separately accessible by the mobile communication device to determine whether the code from the RFID tag represents the driving lock zone for the mobile communication device.

In another embodiment of the invention, a method for preventing a dangerous user behavior with a mobile communication device in a vehicle's interior space is disclosed. This method comprises the steps of: turning on a driving lock on a mobile communication device; interrogating an RFID tag embedded in the vehicle's interior space with an RFID tag reader integrated in the mobile communication device, wherein a tag readable range of the RFID tag defines a driving lock zone in the vehicle's interior space; if a code retrieved from the RFID tag indicates that the code is representing the driving lock zone, disabling particular features defined to be disabled under driving lock options menu, wherein the step of disabling the particular features for the driving lock options menu is provided by a software program executed on a CPU and a memory unit of the mobile communication device; and else if the code retrieved from the RFID tag indicates something other than the driving lock zone, maintaining or activating an enable mode for the particular features under the driving lock options menu.

Yet in another embodiment of the invention, a method of authorizing a supervisory mode for a supervising entity to prevent a dangerous user behavior with a mobile communication device in a vehicle's interior space is disclosed. This method comprises the steps of: activating the supervisory mode for driving lock safety feature on the mobile communication device; entering an authorization password to control and manage the driving lock safety feature; if authorization password is correct and if a user lock code needs to be configured: defining or resetting the user lock code associated with the driving lock safety feature; and if authorization password is correct and if the user lock code does not need to be configured currently: activating or deactivating the driving lock safety feature on the mobile communication device as the supervising entity.

DETAILED DESCRIPTION

Figure 1:
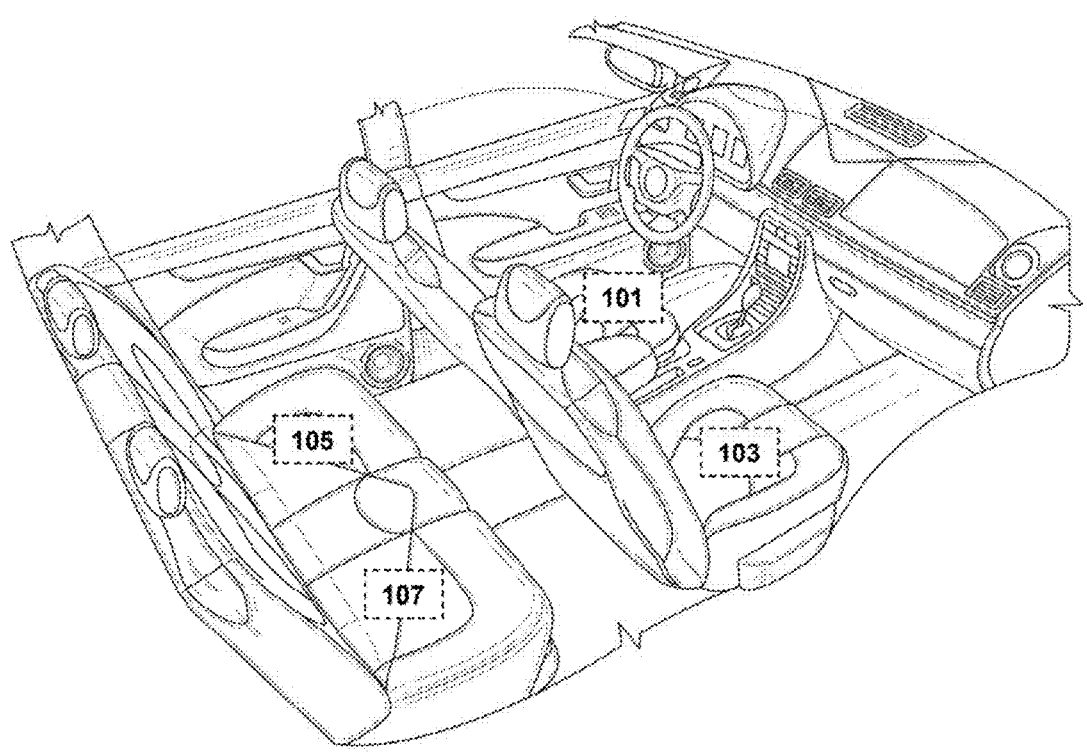
FIG. 1 shows a perspective view of a vehicle interior zone-based apparatus that can prevent a dangerous user behavior with a mobile communication device, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for vehicle interior zone-based prevention of a dangerous user behavior with a mobile communication device. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and do not imply any limitations in the invention.

One aspect of an embodiment of the present invention is to provide an apparatus that can prevent, prohibit, and/or limit a dangerous user behavior with a mobile communication device to reduce user distraction in a vehicle. In one embodiment of the invention, this apparatus may include an RFID tag per vehicle interior zone, a mobile communication device with an integrated RFID tag reader, and a novel software executed on a CPU and a memory unit of the mobile communication device, wherein the novel software and the RFID tag reader read an interior zone authentication code from the RFID tag per vehicle interior zone to determine whether the mobile communication device is in a particular vehicle interior zone such as a "driving lock zone" that requires a temporary lock or disablement of certain features of the mobile communication device. The novel software can also manage and control preventive, restrictive, and disabling actions on certain features of the mobile communication device.

Another aspect of an embodiment of the present invention is to provide a novel method implemented on a software program executed on a CPU and a memory unit of a mobile communication device, wherein the novel method can prevent, prohibit, and/or limit a dangerous user behavior with a mobile communication device to reduce user distraction in a vehicle. Yet another aspect of an embodiment of the present invention is to provide an apparatus and a related method that can define, calibrate, and/or determine a particular vehicle interior zone as a "driving lock zone" for a particular mobile communication device.

Furthermore, an additional aspect of an embodiment of the present invention is to provide an apparatus and a related method that can authenticate and authorize a supervising entity to enable or disable certain device features while a mobile communication device user is driving or performing another attention-requiring activity.

For the purpose of describing the invention, a term "dangerous user behavior" is defined as a person's lack of attention or care to his or her surroundings while interacting with a mobile communication device, wherein the person's lack of attention or care to his or her surroundings can result in an accident or an injury. For example, a user text-messaging to a friend using a cellular phone while driving, walking, or jogging may be considered a dangerous user behavior. In another example, a user browsing the Internet or running a mobile application software on his or her cellular phone while driving may be considered a dangerous user behavior.

Furthermore, for the purpose of describing the invention, a term "driving lock zone" is defined as a vehicle interior zone embedded with one or more RFID tags that identify that particular vehicle interior zone as a driver's seating space or another space that requires or prefers a partial or full functional lock on the mobile communication device for the purpose of reducing driver distraction.

In addition, for the purpose of describing the invention, a term "radio frequency identification," or RFID, is defined as a wireless signal-based identification of a wirelessly-accessible tag, called an "RFID tag" using a wirelessly-accessible tag reader, called "RFID tag reader." In general, an RFID tag contains information which may be written and/or read by the RFID tag reader, an RF antenna operatively connected to the RFID tag reader, or another tag information access device. In one embodiment of the invention, RFID operates in ultra high frequencies (UHF) to achieve longer read/write ranges (e.g. up to several meters) and multiple tag read/write capabilities, which were difficult to achieve in conventional low frequency (LF)-based RFID devices exhibiting shorter read/write ranges (e.g. approximately up to 30 centimeters) and single tag scan functionalities. In one embodiment of the invention, the UHF range for the RFID tag reader is defined by ISO/IEC 18000-6 air interface standard, which utilizes an operating frequency range of 860 MHz~960 MHz. In another embodiment of the invention, the UHF operating frequency range may be defined more broadly as 300 MHz~3 GHz. In general, the conventional LF operating frequencies are below the UHF RFID tag reader operating frequency ranges.

Furthermore, for the purpose of describing the invention, a term "Near Field Communication," or NFC, is defined as a short-distance wireless protocol ratified by ISO/IEC and ECMA as a standardized form of RFID technology. NFC provides enhanced security compared to other RFID protocols by incorporating encryption methods and also by keeping tag reading ranges to be less than approximately 30 centimeters. Therefore, a term such as "NFC tags" and "NFC tag readers" are simply particular types of RFID tags and RFID tag readers, respectively, as opposed to being an entirely different class of technology from other RFID tags and RFID tag readers.

Moreover, for the purpose of describing the invention, a term "attention-requiring activity" is defined as any activity that requires a person's attention to perform or operate safely. Examples of attention-requiring activities include, but are not limited to, driving, walking, and jogging.

In addition, for the purpose of describing the invention, a term "mobile communication device" is defined as a portable electronic device which, at a minimum, can display useful information via a display screen or a projected image. Typically, a mobile communication device also provides wireless communication, data storage, and computation capabilities. Examples of mobile communication devices include, but are not limited to, a cellular phone, a portable computer, a tablet device with one or more touch screens, and a portable game device.

FIG. 1 shows a perspective view (100) of a vehicle interior zone-based apparatus that can prevent a dangerous user behavior with a mobile communication device, in accordance with an embodiment of the invention. In a preferred embodiment of the invention, a vehicle's interior is divided into a multiple number of "zones," wherein each zone is defined by one or more RFID tags (101, 103, 105, 107) identifying that particular zone when a mobile communication device with an integrated RFID tag reader interrogates RFID tags in the vehicle's interior.

For example, in the preferred embodiment of the invention, a first RFID tag (101) defines a "driving lock" zone because a driver sits in this driving lock zone. Preferably, the first RFID (101) tag is embedded in a driver's car seat, in an overhead ceiling space above the driver's car seat, or in another nearby location with the first RFID tag's (101) reading range to be confined within the driver's seat space, so that the mobile communication device placed outside of the driver's seat space will not be able to read the first RFID tag (101) with its integrated RFID tag reader. In one embodiment of the invention, this confined tag reading range per driving lock zone ensures that the driving lock on some or all functions of the mobile communication devices is only enabled in the driving lock zone, and not in other zones of the vehicle's interior (i.e. passenger zones).

Continuing with FIG. 1, in the preferred embodiment of the invention, a second RFID tag (103) defines a front passenger zone, while a third RFID tag (105) defines a first rear passenger zone, and a fourth RFID tag (107) defines a second rear passenger zone. In the preferred embodiment of the invention, the mobile communication device is configured to be at least partially disabled for some functions and features, if it is brought inside the driving lock zone defined by the reading range of the first RFID tag (101), because the driving lock is activated or switched on in the mobile communication device with the integrated RFID tag reader. However, once the mobile communication device is placed outside the driving lock zone (i.e. outside the reading range of the first RFID tag (101)), such as the front passenger zone and the rear passenger zones, the driving lock on the mobile communication device can be released, and any passenger can use the mobile communication device in these zones outside of the driving lock zone.

In another embodiment of the invention, the second RFID tag (103), the third RFID tag (105), and the fourth RFID tag (107) may not be necessary for implementing the apparatus for vehicle interior zone-based prevention of a dangerous user behavior with a mobile communication device, because the first RFID tag (101) alone defines the driving lock zone sufficiently, and other RFID tags may not be necessary for enforcement of the driving lock on the mobile communication device. However, in other embodiments of the invention, incorporating a plurality of RFID tags (e.g. 103,105, 107) outside of the driver's space may be desirable, because the plurality of RFID tags outside of the driver's space enable creation of a multiple number of customized driving lock zones in a vehicle's interior, or creation of customized passenger zone regulations and restrictions for the use of the mobile communication device even in the passenger spaces.

Figure 2:
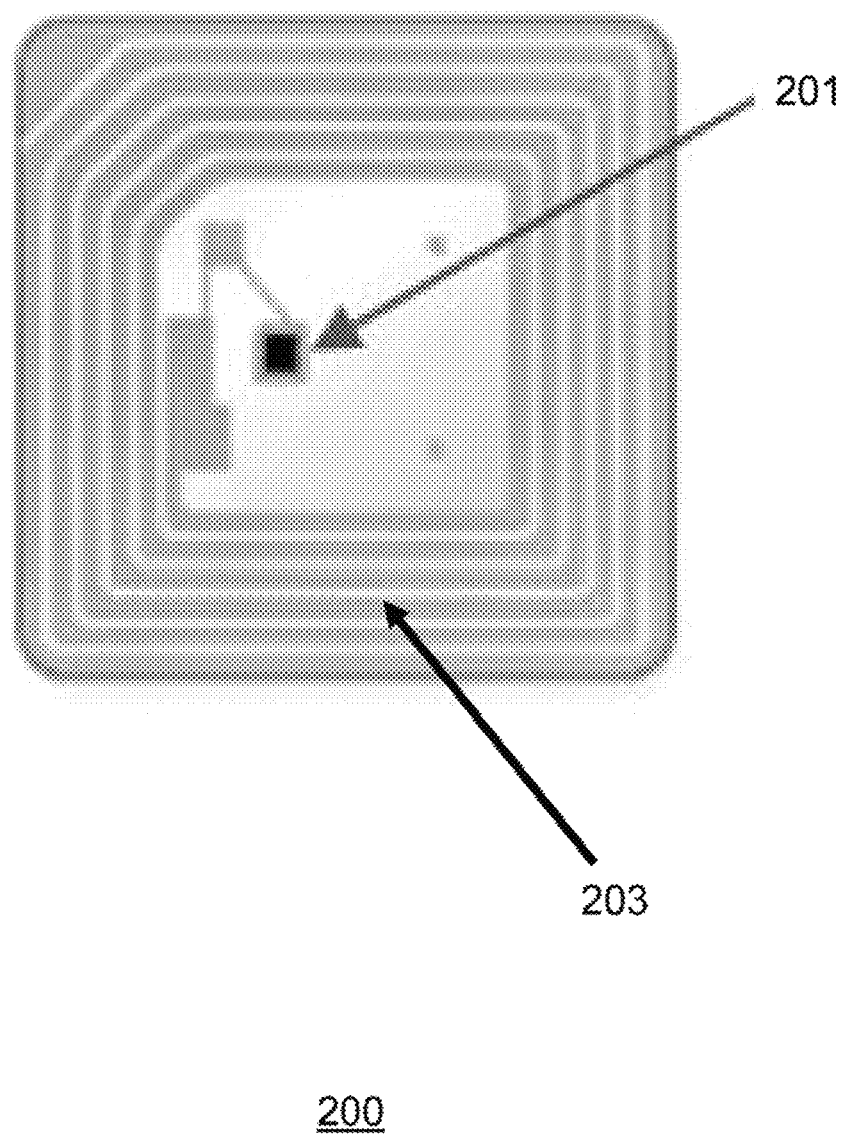
FIG. 2 shows a first example of a radio frequency identification (RFID) tag which can be embedded in a particular zone of a vehicle interior, in accordance with an embodiment of the invention.

FIG. 2 shows a first example of a radio frequency identification (RFID) tag (200) which can be embedded in a particular zone of a vehicle interior, in accordance with an embodiment of the invention. The RFID tag (200) may be an NFC tag or another type of RFID tag, such as a UHF RFID tag or an LF RFID tag. In a preferred embodiment of the invention, the RFID tag (200) is a battery-less (i.e. without a battery) "passive" tag, which comprises a non-volatile memory unit inside an integrated circuit portion (201) and an RF antenna portion (203) encapsulated by plastic, ceramic, or metallic covering. In the preferred embodiment of the invention, the non-volatile memory unit inside the integrated circuit portion (201) stores tag-related information which may be overwritten or updated by an RFID tag reader. Furthermore, the integrated circuit portion (201) may also contain logical units that enable tag information processing, radio frequency signal modulation and demodulation, and electromagnetic power collection and activation of the RFID tag (200) from the RFID tag reader's electromagnetic power delivered to the integrated circuit portion (201). Furthermore, the RF antenna portion (203) of the RFID tag (200) is configured to receive, focus, and/or amplify an electromagnetic signal from the RFID tag reader to energize the integrated circuit portion (201) of the RFID tag (200) to transmit information from or send information to the non-volatile memory unit in the integrated circuit portion (201).

In another embodiment of the invention, the RFID tag (200) may be a battery-powered "active" tag, which may have a longer tag read and write range than a passive tag. However, in a preferred embodiment of the invention, passive RFID tags may provide more convenience of forming and operating a driving lock zone and other RFID-reading zones inside a vehicle, because tag battery replacement cycles and other maintenance issues associated with active RFID tags may be too cumbersome for practical operation, compared to passive RFID tags.

Figure 3:
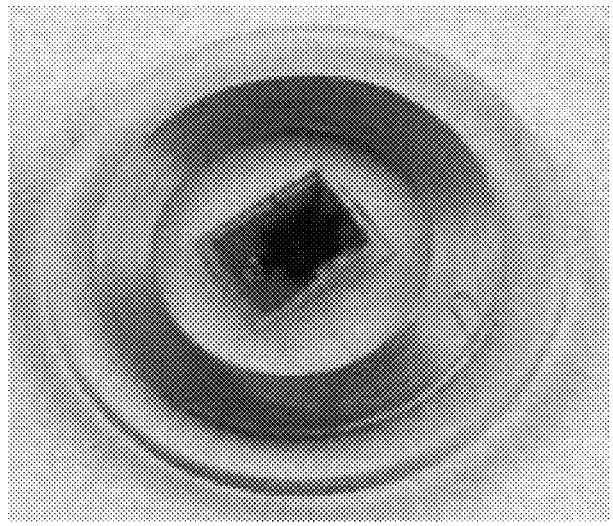
FIG. 3 shows a second example and a third example of radio frequency identification (RFID) tags which can be embedded in certain zones of a vehicle interior, in accordance with an embodiment of the invention.
Figure 3:
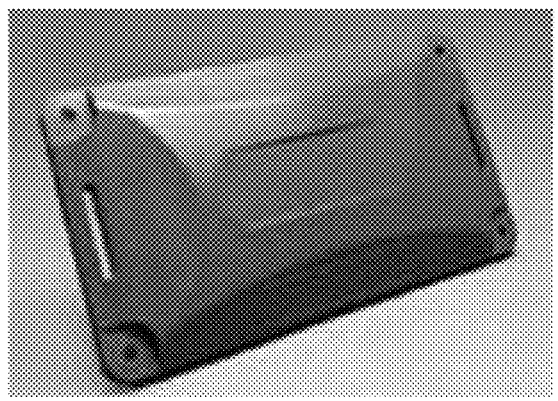

FIG. 3 shows a second example (301) and a third example (303) of radio frequency identification (RFID) tags (300), which can be embedded in certain zones of a vehicle interior, in accordance with an embodiment of the invention. These RFID tags (300) may be NFC tags or another type of RFID tags, such as UHF RFID tags or LF RFID tags. Similar to the previously-described first example of an RFID tag as shown in FIG. 2, these examples (301, 303) of RFID tags (300) can be each embedded in a particular zone of a vehicle interior, in accordance with an embodiment of the invention.

In a preferred embodiment of the invention, each of the second example (301) and the third example (303) of the RFID tags (300) is a battery-less (i.e. without a battery) "passive" tag, which comprises a non-volatile memory unit inside an integrated circuit portion and an RF antenna portion encapsulated by plastic, ceramic, or metallic covering. As shown in FIG. 3, the second example (301) has a circular shape with a circular RF antenna portion surrounding an integrated circuit portion inside the circular RF antenna portion. On the other hand, the third example (303) is encapsulated in a rectangular package, but still contains an RF antenna portion and an integrated circuit portion inside the rectangular package.

In the preferred embodiment of the invention, the non-volatile memory unit inside the integrated circuit portion in each of the RFID tags (300) stores tag-related information which may be overwritten or updated by an RFID tag reader. Furthermore, the integrated circuit portion in each of the RFID tags (300) may also contain logical units that enable tag information processing, radio frequency signal modulation and demodulation, and electromagnetic power collection and activation of each of the RFID tags (300) from the RFID tag reader's electromagnetic power delivered to the integrated circuit portion. Furthermore, the RF antenna portion of each of the RFID tags (300) is configured to receive, focus, and/or amplify an electromagnetic signal from the RFID tag reader to energize the integrated circuit portion of each of the RFID tags (300) to transmit information from or send information to the non-volatile memory unit in the integrated circuit portion of each of the RFID tags (300).

In another embodiment of the invention, each of the RFID tags (300) may be a battery-powered "active" tag, which may have a longer tag read and write range than a passive tag. However, in a preferred embodiment of the invention, passive RFID tags may provide more convenience of forming and operating a driving lock zone and other RFID-reading zones inside a vehicle, because tag battery replacement cycles and other maintenance issues associated with active RFID tags may be too cumbersome for practical operation, compared to passive RFID tags.

Figure 4:
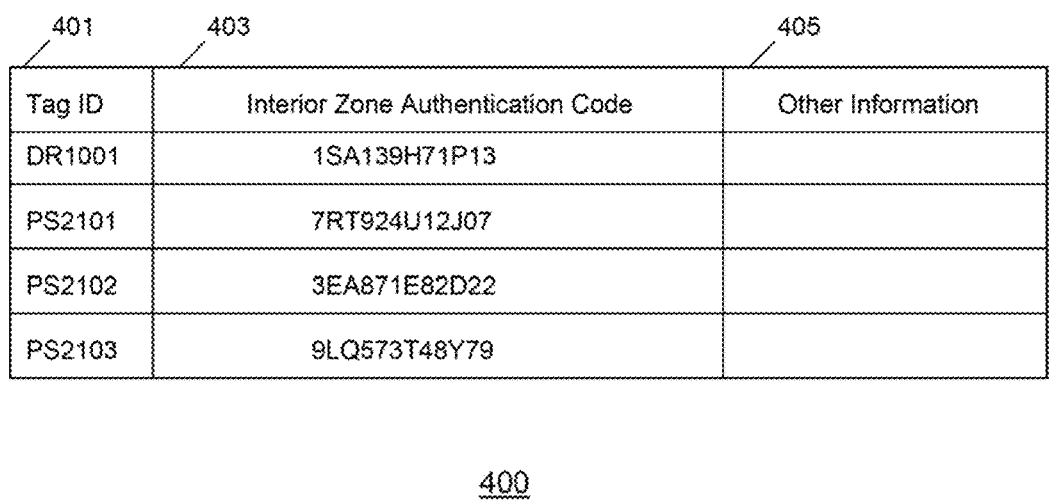
FIG. 4 shows a table of data contents which may be statically or dynamically stored in radio frequency identification (RFID) tags for authentication and validation of vehicle interior zones with a mobile communication device that contains an RFID tag reader, in accordance with an embodiment of the invention.

FIG. 4 shows a table (400) of data contents which may be statically or dynamically stored in radio frequency identification (RFID) tags for authentication and validation of vehicle interior zones with a mobile communication device that contains an RFID tag reader, in accordance with an embodiment of the invention. In a preferred embodiment of the invention, each RFID tag identified by its "Tag ID" (401) is configured to store an Interior Zone Authentication Code (403) and/or other information (405). In the preferred embodiment of the invention, each RFID tag is embedded in a vehicle's seat, in an overhead ceiling area of the vehicle, or in a nearby space to define a particular vehicle interior zone (e.g. a driving lock zone, a front passenger zone, a rear passenger zone, and etc.).

For example, in one embodiment of the invention as shown in FIG. 4, a first RFID tag in the table (400) has a Tag ID of "DR1001," which is used to uniquely identify the first RFID tag by an RFID tag reader. This first RFID tag also contains an alphanumeric code, "1SA139H71P13" as an Interior Zone Authentication Code (403), which identifies a particular vehicle interior zone (e.g. a driving lock zone, a front passenger zone, a rear passenger zone, and etc.) in a vehicle. In one embodiment of the invention, the Interior Zone Authentication Code (403) may be a static code which generally does not change over time even after a multiple number of data interrogation by the RFID tag reader. In this embodiment, the Interior Zone Authentication Code (403) in the first RFID tag is read by an integrated RFID reader and a software program executed on a CPU and a memory unit of a mobile communication device, and then compared against a known set of authentication codes separately accessible by the mobile communication device for identifying a particular vehicle interior zone.

In another embodiment of the invention, the Interior Zone Authentication Code (403) may be a dynamically-changeable code, or a "rolling" code, which generally changes every time a data interrogation is successfully performed by the RFID tag reader. In this embodiment, the Interior Zone Authentication Code (403) in the first RFID tag is read by an integrated RFID reader and a software program executed on a CPU and a memory unit of a mobile communication device, and then compared against a known set of dynamically-changeable authentication codes separately accessible by the mobile communication device for identifying a particular vehicle interior zone. Once the particular vehicle interior zone is recognized and identified by the software program and the integrated RFID reader of the mobile communication device, the Interior Zone Authentication Code (403) stored in the first RFID tag may be changed or re-written to a new code generated from the mobile communication device. The dynamically-changeable or "rolling-code" Interior Zone Authentication Code (403) in this embodiment of the invention improves data security and deters successful hacking of the apparatus that provides vehicle interior zone-based driving lock of certain mobile communication device features.

Continuing with FIG. 4, in one embodiment of the invention, once the software program and the integrated RFID reader of the mobile communication device successfully compare an Interior Zone Authentication Code (403) stored in an RFID tag against a known set of authentication codes separately accessible by the mobile communication device, if the Interior Zone Authentication Code (403) interrogated from the RFID tag is recognized as a driving lock zone and if the driving lock feature is enabled in the mobile communication device, the mobile communication device can restrict, prohibit and/or prevent a user from accessing or using particular features of the mobile communication device that are supposed to be disabled in the driving lock zone.

On the other hand, in one embodiment of the invention, if the Interior Zone Authentication Code (403) interrogated from the RFID tag is recognized as something other than the driving lock zone or a zone that does not require a driving lock, then the mobile communication device may enable, continue, or activate the particular features of the mobile communication device that are supposed to be disabled only in the driving lock zone.

Figure 5:
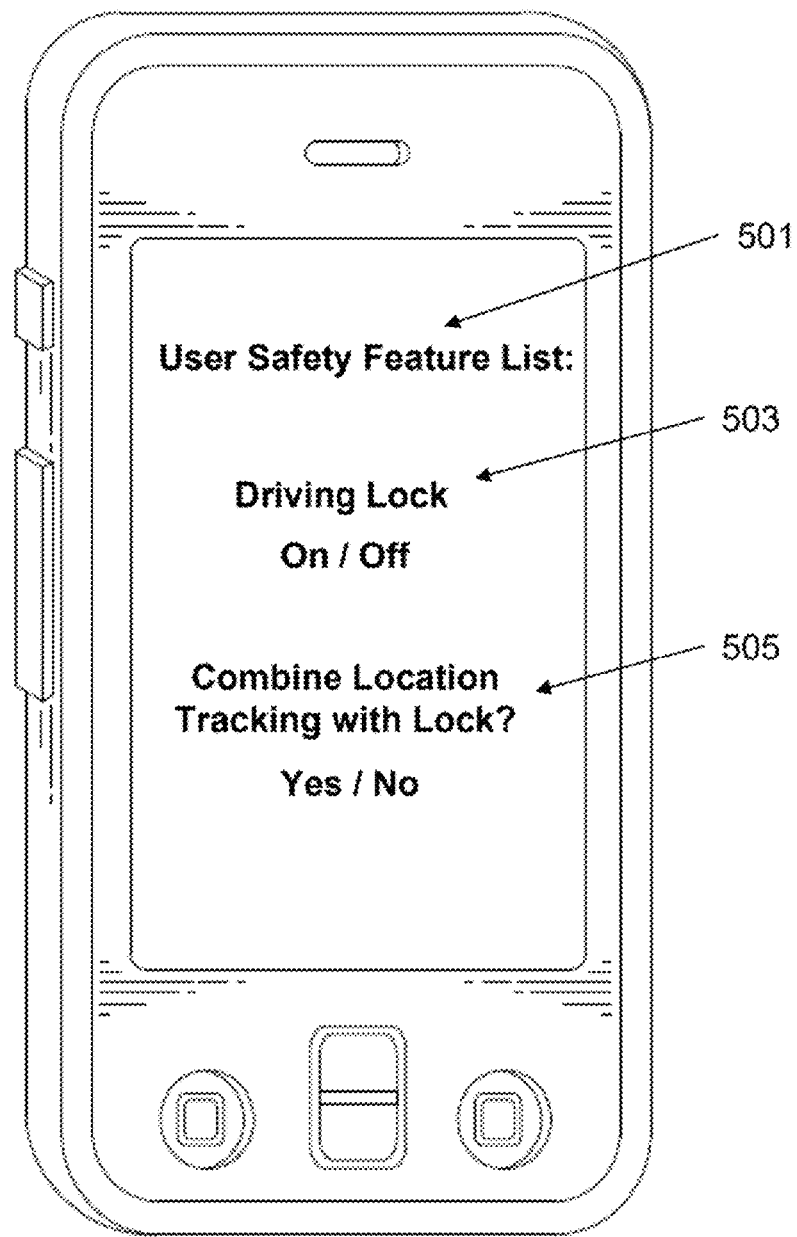
FIG. 5 shows a first screenshot of a mobile communication device that displays a user safety feature list, in accordance with an embodiment of the invention.

FIG. 5 shows a first screenshot (500) of a mobile communication device that displays a user safety feature list (501), in accordance with an embodiment of the invention. In a preferred embodiment of the invention, the mobile communication device integrates an RFID tag reader comprising an integrated RF antenna and an RF tag reader circuitry. Furthermore, in the preferred embodiment of the invention, a software program is executed on a CPU and a memory unit of the mobile communication device. In one embodiment of the invention, the RFID tag reader is an NFC tag reader configured to interrogate NFC tags for data read or write functions. In another embodiment of the invention, the RFID tag reader is another type of RFID tag reader, such as a UHF RFID tag reader or an LF RFID tag reader, which can interrogate a corresponding type of RFID tags for data read or write functions.

In a preferred embodiment of the invention, a software program associated with an integrated RFID tag reader is executed on a CPU and a memory unit of the mobile communication device. This software program is configured to receive and interpret values from the integrated RFID tag reader to compare a code read from an RFID tag (e.g. an Interior Zone Authentication Code) with a code from a known set of data separately accessible by the mobile communication device to verify and recognize a vehicle interior zone that the code represents. Furthermore, in one embodiment of the invention, the software program is also configured to control and manage the user safety feature list (501), which may include a "driving lock" (503), an option to combine a location tracking feature (505) with any lock function under the user safety feature list (501), and/or another mobile communication device functional lock against another attention-requiring activity that qualifies as a dangerous user behavior. Therefore, in one embodiment of the invention, the software program may be also configured to control and manage other locks such as a "walking lock," a "jogging lock," or another full or partial function lock during an attention-requiring activity by a mobile communication device user.

Furthermore, in one embodiment of the invention, if the option to combine the location tracking feature (507) with the driving lock (503) is implemented, incorporated, and turned on as part of the user safety feature list, then the driving lock (503) may be enabled only when the location tracking feature (507) informs the software program that the real-time location of the mobile communication device is changing due to a user's driving while the mobile communication device is within the driving lock zone for a certain amount of time. Utilizing a combination of real-time location tracking of the mobile communication device with the vehicle and RFID tag-based determination of a driving lock zone inside the vehicle may reduce false lock trigger and may improve usability of the driving lock (503) in some embodiments of the invention. For example, a user may be in the driver's seat while parking the car in a stationary position, and may want the driving lock (503) to remain disengaged as long as the vehicle is stationary, because the user is not placing himself or anyone else in a seriously-dangerous situation in public roads or public places. By turning the option to combine the location tracking feature (505) with the driving lock (503) "on," the user is able to avoid at least some unnecessary driving lock triggers.

In one embodiment of the invention, the location tracking feature (505), when turned on, can utilize Global Positioning System (GPS) receiver to determine whether the mobile communication device is moving or changing its position for a certain amount of time. The GPS receiver is often integrated in today's mobile communication devices as a standard feature for a variety of mobile applications, which makes combining the location tracking feature (505) with the driving lock (503) cost-effective and easy to implement in one embodiment of the invention.

In another embodiment of the invention, the location tracking feature (505) may be completed by tracking cellular base station signal strength changes, wireless LAN signal strength changes, and/or cellular base station identification numbers. Yet in another embodiment of the invention, another real-time location determination technique may be utilized to implement the location tracking feature (505). Yet in another embodiment of the invention, the location tracking feature (505) may use a combination of the GPS receiver-based tracking and other location tracking methods, depending on the availability of GPS signals and other available methods for real-time location determination.

Continuing with FIG. 5, in a preferred embodiment of the invention, the user safety feature list (501) is part of an operating system-level control panel that can enable (i.e. turn on) or disable (i.e. turn off) the driving lock (503) and/or the option to combine the location tracking feature (505) with any lock function under the user safety feature list (501) by a supervising entity to a user on a mobile communication device. In this embodiment of the invention, the user safety feature list (501), the driving lock (503), and/or the option to combine the location tracking feature (505) with any lock function under the user safety feature list (501) are operated and executed as an inherent native function of the operating system with the integrated RFID tag reader and an associated operating system-level software program. In the preferred embodiment of the invention, the supervising entity may be a parent whose child is the user of the mobile communication device under a parental supervision. The supervising entity may also be an employer whose employee is the user of the mobile communication device under a corporate supervision. In an alternate embodiment of the invention, no supervising entity is configured to control and manage the user safety feature list (501), and all control and management functions related to the user safety feature list (501) are merely delegated to the user of a mobile communication device.

In another embodiment of the invention, the user safety feature list (501) is part of a mobile application-level program installed on an operating system of a mobile communication device. In this embodiment of the invention, the user safety feature list (501), the driving lock (503), and/or the option to combine the location tracking feature (505) with any lock function under the user safety feature list (501) are operated and executed as the mobile application-level program with the integrated RFID tag reader and the operating system, instead of being an inherent native function of the operating system.

In one embodiment of the invention, the driving lock (503) can be enabled (i.e. turned on) or disabled (i.e. turned off) by a supervising entity to a mobile communication device. In another embodiment of the invention, the driving lock (503) can be enabled (i.e. turned on) or disabled (i.e. turned off) by a user of the mobile communication device. If the driving lock (503) is enabled, then specific functions and features (e.g. 603, 605, 607 of FIG. 6) of the mobile communication device can be prevented, prohibited, and/or limited from being used or accessed by the user, when the tag data read from an RFID tag embedded in a vehicle interior zone indicates that the mobile communication device is currently in the driving lock zone. In a preferred embodiment of the invention, the integrated RFID tag reader and the associated software in the mobile communication device can continuously or periodically scan for a nearby RFID tag, so that the mobile communication device can readily recognize its current position inside a vehicle's interior by retrieving a particular Interior Zone Authentication Code from a nearby RFID tag embedded in a particular vehicle interior zone.

In a preferred embodiment of the invention, the readable range of each RFID tag embedded in a vehicle's particular interior zone is specifically tuned to define and identify each zone (e.g. a driving lock zone, a front passenger zone, a rear passenger zone, and etc.) inside the vehicle when a mobile communication device with an integrated RFID tag reader interrogates an RFID tag embedded in the vehicle's particular interior zone. In one embodiment of the invention, if there are erroneous reading of multiple RFID tags representing a multiple number of vehicle interior zones, a software executed in a CPU and a memory unit of the mobile communication device may filter out weaker or farther-distance signals from certain RFID tags, while making the assumption of nearest-distance signals from a nearest RFID tag as representing the current vehicle interior zone for the mobile communication device.

Furthermore, in one embodiment of the invention, if the option to combine the location tracking feature (505) with the driving lock (503) is implemented, incorporated, and turned on as part of the user safety feature list, then the driving lock (503) may be enabled only when the location tracking combination feature (505) informs the software program that the mobile communication device is moving or changing its position with the vehicle for a certain amount of time while the mobile communication device is in a driving lock zone of the vehicle. This certain amount of "wait" time (i.e. before determining that the mobile communication device has been moving or changing its position) can be set by a supervising entity or a mobile device communication device user in some embodiments of the invention by adjusting or defining the amount of wait time in an options menu displayed on a touch screen interface or presented to the supervising entity or the mobile device communication device user.

Figure 6:
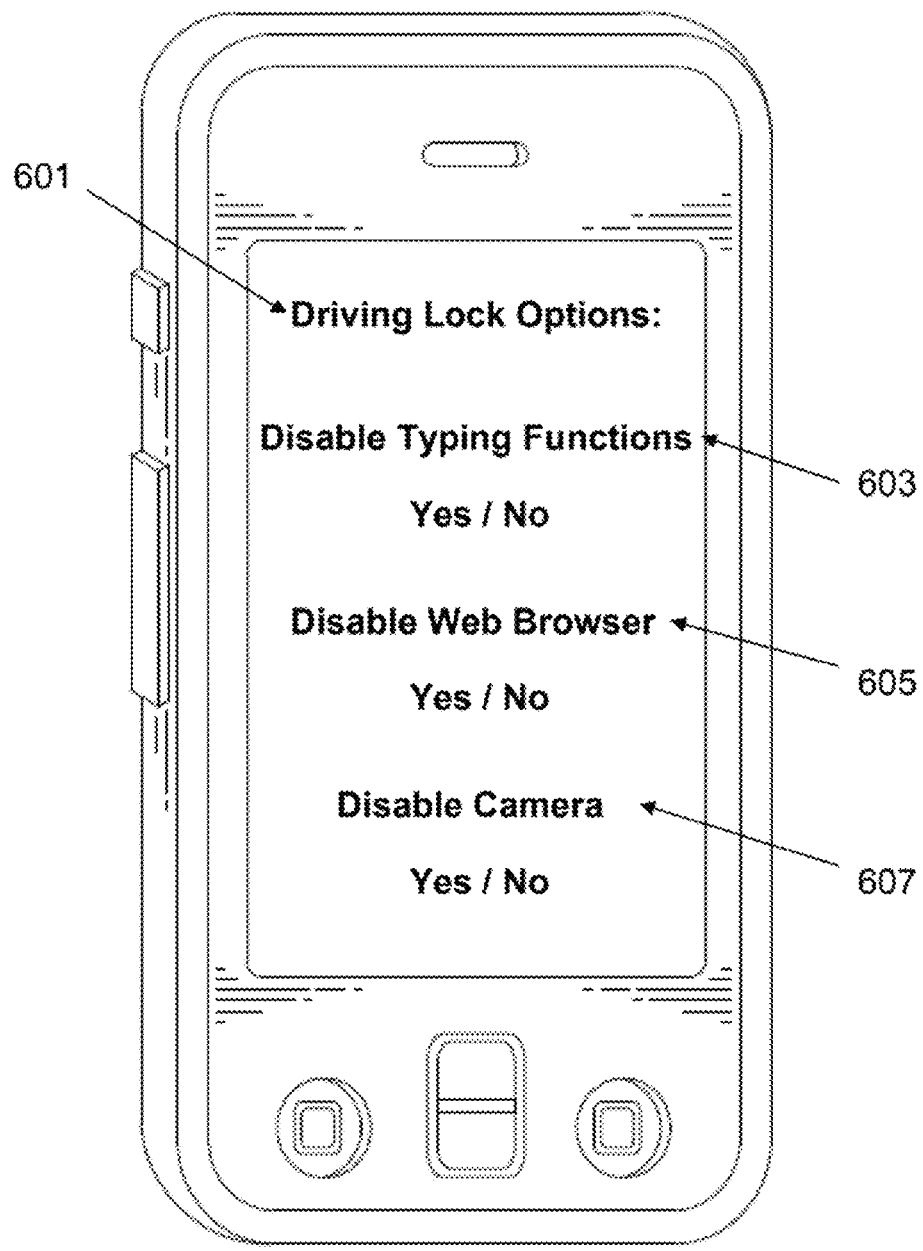
FIG. 6 shows a second screenshot of a mobile communication device that displays a "driving lock" options, in accordance with an embodiment of the invention.

FIG. 6 shows a second screenshot (600) of a mobile communication device that displays a "driving lock" options (601), in accordance with an embodiment of the invention. In a preferred embodiment of the invention, the driving lock options (601) comprises a touch-sensitive and/or remotely-controllable user interface. In the preferred embodiment of the invention, this touch-sensitive and/or remotely-controllable user interface can include a menu to disable typing functions (603), a menu to disable a web browser (605), and a menu to disable camera (607), if the driving lock (i.e. 503 of FIG. 5) is currently "turned on" or enabled. In one embodiment of the invention, menus (e.g. 603, 605, 607) listed under the driving lock options (601) empower a supervising entity or a mobile communication device user to either enable or disable certain functions or features, such as typing, web browsing, or picture taking, when the mobile communication device is currently determined to be located in a driving lock zone of a vehicle's interior space.

In a preferred embodiment of the invention, the determination of a current location of a mobile communication device inside a vehicle is made by retrieving an Interior Zone Authentication Code from an RFID tag embedded in a particular interior zone of the vehicle, and then comparing the retrieved Interior Zone Authentication Code against a known set of codes separately accessible by the mobile communication device for validation and recognition of the particular interior zone.

In one embodiment of the invention, if a supervising entity, such as a parent or an employer, is configuring the driving lock options (601) and/or the user safety feature list (i.e. 501 of FIG. 5), then a mere user of the mobile communication device may not be able to disable or turn off the driving lock (i.e. 503 of FIG. 5) and/or individual menus (603, 605, 607) listed under the driving lock options (601) without a validated authorization of the supervising entity. An example regarding validation and authorization steps for controlling and managing safety features and lock functions of a mobile communication device by a supervising entity is further described in association with FIG. 10.

In another embodiment of the invention, if there is no supervising entity set up for controlling and managing safety features and lock functions on a mobile communication device, then a mobile communication device user may be empowered with all necessary control and management functions, including setting the user safety feature list (i.e. 501 of FIG. 5) and setting specific menus under the driving lock options (501).

Figure 7:
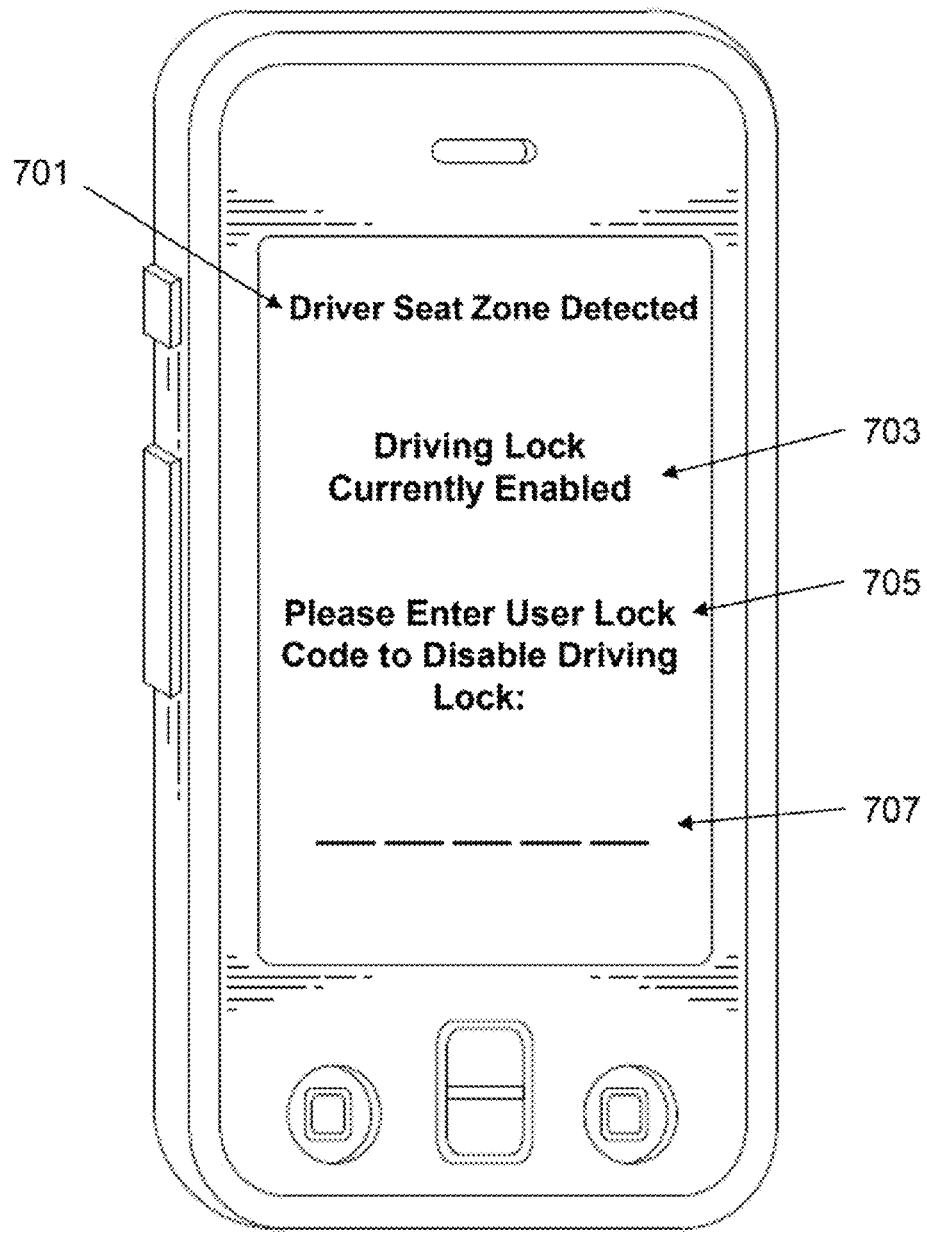
FIG. 7 shows a third screenshot of a mobile communication device that displays a driving lock status and a user lock code entry interface, in accordance with an embodiment of the invention.

FIG. 7 shows a third screenshot (700) of a mobile communication device that displays a driving lock status (701, 703) and a user lock code entry interface (705, 707), in accordance with an embodiment of the invention. In a preferred embodiment of the invention, a software program associated with an integrated RFID tag reader is executed on a CPU and a memory unit of the mobile communication device. This software program is configured to receive and interpret values from the integrated RFID tag reader to compare a code read from an RFID tag (e.g. an Interior Zone Authentication Code) with a code from a known set of data separately accessible by the mobile communication device to verify and recognize a vehicle interior zone that the code represents. Furthermore, as shown in FIG. 7, the software program associated with the integrated RFID tag reader in the mobile communication device can provide a current driving lock zone status (701) to a user by displaying a message such as "Driver Seat Zone Detected" and/or an graphical icon on a display screen of the mobile communication device. Similarly, the software program associated with the integrated RFID tag reader in the mobile communication device can also provide a current driving lock enable/disable status (703), which is typically controlled by a supervising entity of the mobile communication device or a mobile communication device user using a menu for the user safety feature list (e.g. 501, 503 of FIG. 5) or another user interface.

Furthermore, in one embodiment of the invention, the user lock code entry interface (705) may be implemented to allow an authorized mobile communication device user with a lock-overriding privilege to override and/or release the driving lock, if the authorized mobile communication device user enters a correct user lock code in a user lock code entry menu (707) to disable the driving lock, as shown in FIG. 7. In a preferred embodiment of the invention, the user lock code entry interface (705) is implemented as a touch-screen display interface. In another embodiment of the invention, the user lock code entry interface (705) can be implemented with a physical key, a physical keypad, and/or a physical keyboard.

Figure 8:
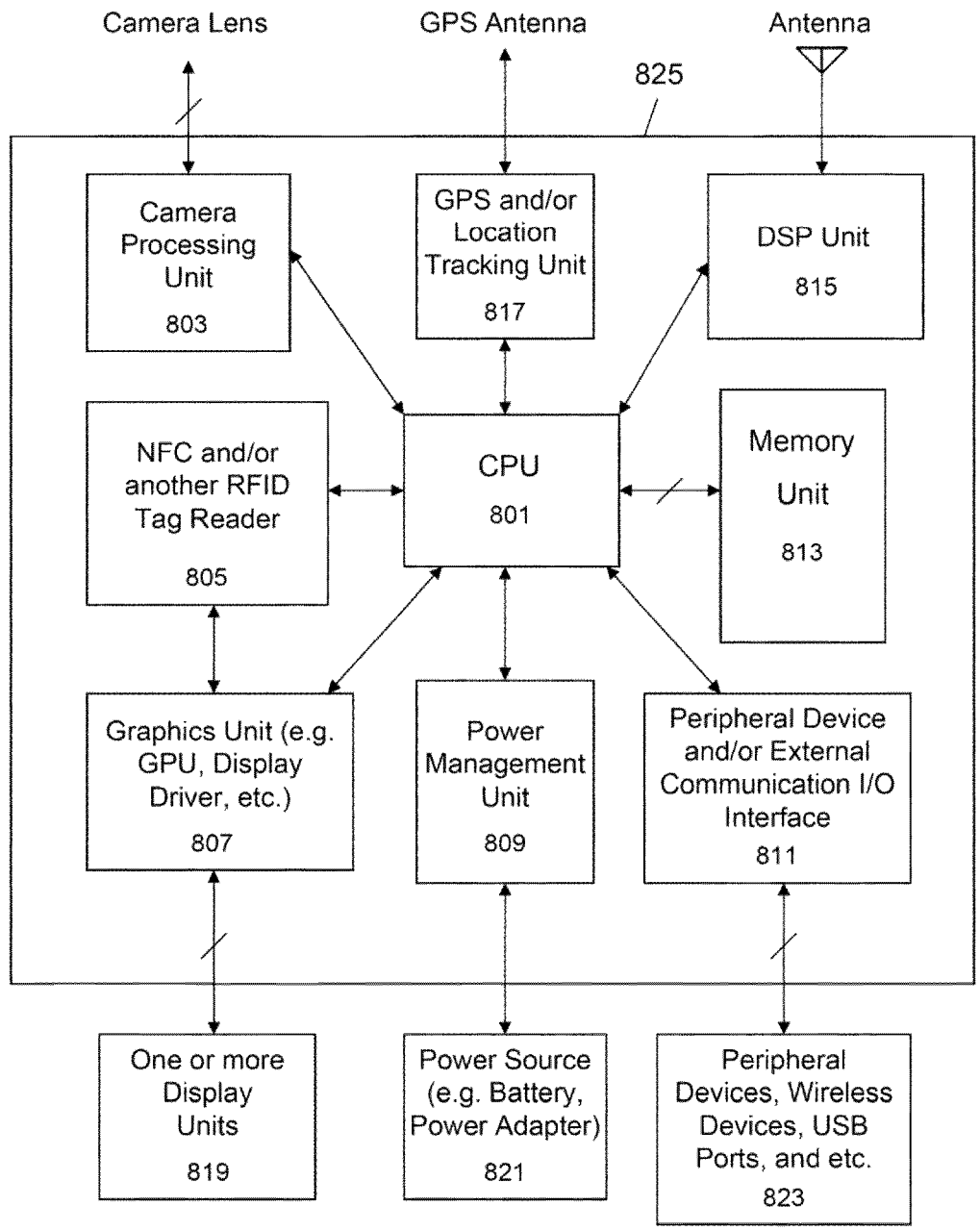
FIG. 8 shows a hardware block diagram for a mobile communication device with an integrated near-field communication (NFC) reader or another RFID tag reader for vehicle interior zone-based prevention of a dangerous user behavior, in accordance with an embodiment of the invention.

FIG. 8 shows a hardware block diagram (800) for a mobile communication device with an integrated near-field communication (NFC) reader (805) or another RFID tag reader (805) for vehicle interior zone-based prevention of a dangerous user behavior, in accordance with an embodiment of the invention. In one embodiment of the invention, the integrated NFC reader or another RFID tag reader (805) is operatively connected to an RF antenna for amplified data transmission to and reception from an RFID tag. In a preferred embodiment of the invention, the mobile communication device has a CPU (801) which is operatively connected to a memory unit (813), an NFC and/or another RFID tag reader (805), a camera processing unit (803), a graphics unit (807) (e.g. a graphics processor, a display driver, and etc.), a power management unit (809), a peripheral device and/or external communication I/O interface (811), a digital signal processing (DSP) unit (815), a GPS and/or location tracking unit (817), and a sound unit. These logical units may be placed on a single printed circuit board (825) in one embodiment of the invention, or a plurality of printed circuit boards in another embodiment of the invention.

In the preferred embodiment of the invention, the CPU (801) is configured to control each logical unit operatively (i.e. directly or indirectly) connected to the CPU (801). The memory unit (813) typically comprises volatile memory banks based on DRAM's. In some embodiments of the invention, the memory unit (813) may use non-volatile memory technologies such as SRAM's and/or Flash memory. The memory unit (813) is capable of storing programs and applications which can be executed by the CPU (801), the graphics unit (807), or another logical unit operatively connected to the memory unit (813). In particular, in the preferred embodiment of the invention, a software program executed on the CPU (801) and the memory unit (813) of the mobile communication device controls and manages driving lock functions and the integrated RFID reader (805) for interrogating an RFID tag embedded in a vehicle's interior zone. This software program may be part of an operating system of the mobile communication device, or a separate mobile application installed on the operating system of the mobile communication device.

In one embodiment of the invention, the integrated RFID reader (805) is an NFC RFID reader configured to interrogate NFC tags for data write and read functions. In another embodiment of the invention, the integrated RFID reader (805) is an UHF RFID reader or an LF RFID reader configured to interrogate a corresponding type of RFID tags for data write and read functions. In general, the integrated RFID tag reader (805) is controlled and managed by an associated software program executed on the CPU (801) and the memory unit (813), wherein this associated software program can retrieve data contents stored in an RFID tag embedded in a vehicle's interior space, and further calibrate, determine, and/or recognize a particular vehicle interior zone defined by the RFID tag.

Continuing with FIG. 8, the camera processing unit (803) is operatively connected to a camera lens on the mobile communication device, and is able to process image-related data from the camera lens in association with the CPU (801) and/or other logical units in the mobile communication device. In a preferred embodiment of the invention, if a driving lock is enabled inside a driving lock zone, the camera processing unit (803) may be at least temporarily restricted or disabled from taking user commands for camera-related operation by the CPU (801) and a software executed on the CPU (801) in association with the integrated RFID tag reader (805), if disabling the camera is selected as part of a driving lock option, as previously described in association with FIG. 6. Similarly, in the preferred embodiment of the invention, a typing function and/or a web-browsing function may be disabled by the CPU (801) and the software executed on the CPU (801) in association with the integrated RFID tag reader (805), if the driving lock is enabled inside a driving lock zone, and if disabling the typing function and/or the web-browsing function is selected as part of the driving lock option.

Furthermore, as shown in FIG. 8, the digital signal processing (DSP) unit (815) is operatively connected to an radio frequency (RF) antenna. The DSP unit (815) is generally configured to receive and transmit radio data and/or voice signals wirelessly for the mobile communication device. Moreover, the power management unit (809) is operatively connected to a power supply unit and a power source (e.g. battery, power adapter) (821), and the power management unit (809) generally controls power supplied to a mobile communication device and its logical units. In addition, the peripheral device and/or external communication I/O interface (811) as shown in FIG. 8 can be operatively connected to one or more peripheral devices, wireless devices, USB ports, and other external data communication media (823).

Continuing with FIG. 8, in the preferred embodiment of the invention, the graphics unit (807) in the system block diagram (800) for the mobile communication device with an integrated pedometer comprises a graphics processor, a display driver, a dedicated graphics memory unit, and/or another graphics-related logical components. In general, the graphics unit (807) is able to process and communicate graphics-related data with the CPU (801), the display driver, and/or the dedicated graphics memory unit. The graphics unit (807) is also operatively connected to one or more display units (819). In addition, the CPU (801) may be operatively connected to the sound unit which contains audio-related logical components for generation or recording of audio data from the mobile communication device.

Furthermore, the GPS and/or location tracking unit (817) may comprise a GPS signal receiver and/or another real-time location tracking chip, which enable the mobile communication device to detect and determine the real-time change in location and position of the mobile communication device.

As described previously, if the option to combine the location tracking (e.g. 505 of FIG. 5) with the driving lock is turned on, then the output from the GPS and/or location tracking unit (817) may be utilized by a software associated with the integrated RFID tag reader to determine when to enable or disable the driving lock.

Figure 9:
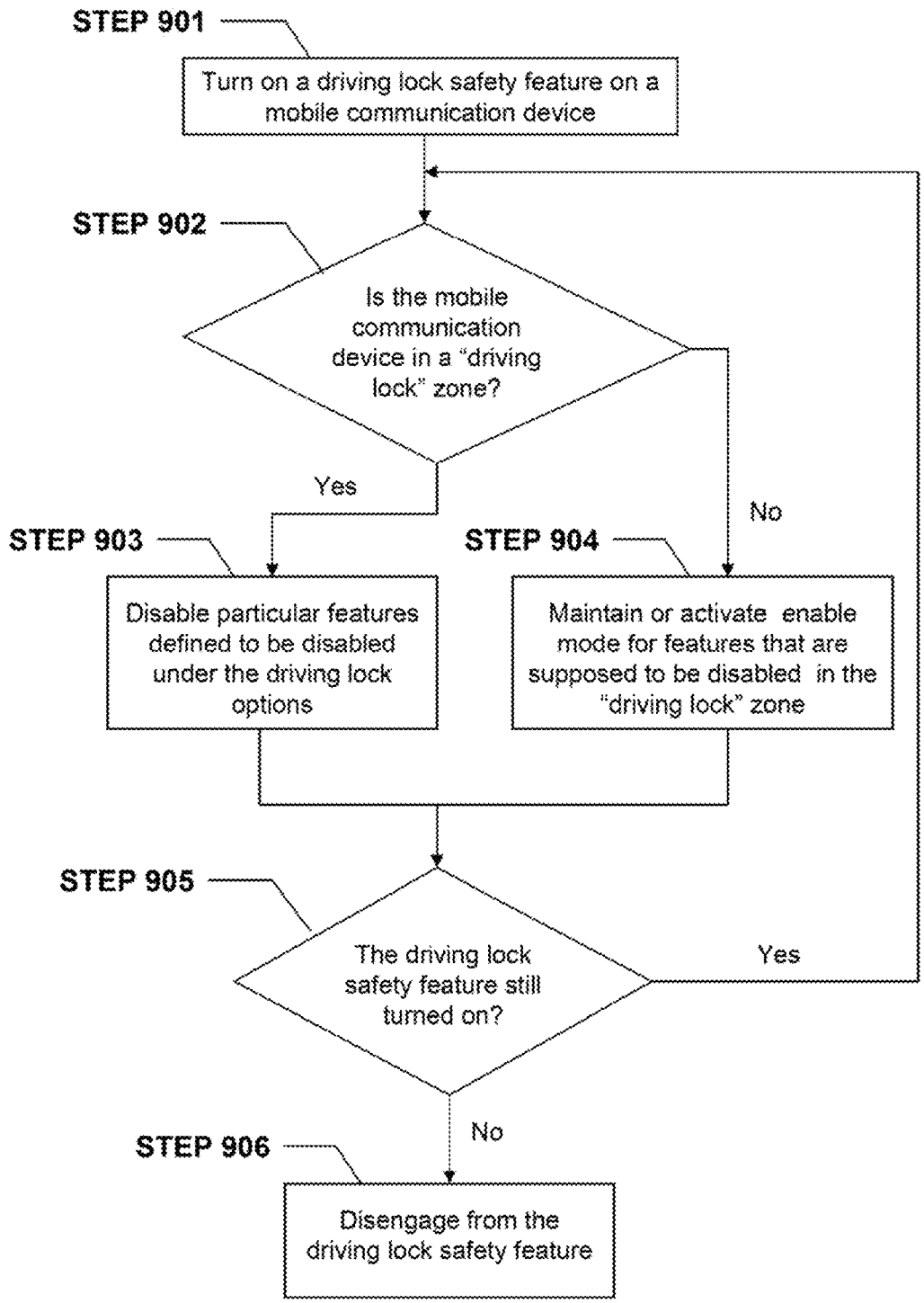
FIG. 9 shows a flowchart for a method of preventing, prohibiting, and/or limiting a dangerous user behavior with a mobile communication device, in accordance with an embodiment of the invention.

FIG. 9 shows a flowchart (900) for a method of preventing, prohibiting, and/or limiting a dangerous user behavior with a mobile communication device, in accordance with an embodiment of the invention. In a preferred embodiment of the invention, a supervising entity, such as a parent to a child, or an employer to an employee, enables a driving lock safety feature on a mobile communication device, as shown in STEP 901. In another embodiment of the invention, a mobile communication device user himself or herself may enable the driving lock safety feature on the mobile communication device.

Once the driving lock safety feature is enabled by either a supervising entity or a mobile communication device user, an integrated RFID tag reader and an associated software in the mobile communication device continuously or periodically transmits signals to check whether there is an accessible RFID tag with an Interior Zone Authentication Code or another piece of identifying information within a certain tag-readable range. In a preferred embodiment of the invention, the tag-readable range may be between tens of centimeters to one meter, wherein the tag-readable range is fine-tuned per vehicle's interior and is designed to identify a particular vehicle interior zone per RFID tag. If the integrated RFID tag reader and the associated software in the mobile communication device determine that the mobile communication device is within a driving lock zone of the vehicle, as shown in STEP 902, then the associated software, which operates in a CPU and a memory unit of the mobile communication device, can disable particular features (e.g. 603, 605, 607 of FIG. 6) defined to be disabled, restricted, and/or prohibited under the driving lock options, as shown in STEP 903. Furthermore, in another embodiment of the invention, if the option to combine the location tracking feature (e.g. 505 of FIG. 5) with the driving lock is implemented, incorporated, and turned on as part of the user safety feature list (e.g. 501 of FIG. 5), then the driving lock may be enabled only when the location tracking combination feature informs the associated software that the mobile communication device is moving or changing its position with the vehicle for a certain amount of time.

On the other hand, if the mobile communication device is determined to be not within the driving lock zone of the vehicle based on RFID tag interrogation activities performed by the integrated RFID tag reader in the mobile communication device, and/or if the location tracking feature indicates that the mobile communication device is not moving or not changing its position with the vehicle for a certain amount of time, then the associated software can maintain or activate "enable" mode for features that are supposed to be disabled, restricted, and/or prohibited while the mobile communication device is inside the driving lock zone, as shown in STEP 904.

Then, the associated software can check whether the driving lock remains to be turned on by the supervising entity or the mobile communication device user, as shown in STEP 905. If the driving lock remains to be turned on, then the associated program loops back to STEP 902, where the integrated RFID tag reader continuously or periodically scans nearby objects for a new RFID tag reading to determine whether the mobile communication device is still in the driving lock zone. This loop back ensures that the particular features defined to be disabled under the driving lock options remain disabled, restricted, and/or prohibited as long as the mobile communication device is determined to be inside the driving lock zone of the vehicle. Likewise, the loop back also ensures that the particular features defined to be disabled under the driving lock options are enabled for use whenever the mobile communication device is outside of the driving lock zone of the vehicle.

Continuing with FIG. 9, when the driving lock is turned off by the supervising entity or the mobile communication device user as also shown in STEP 905, then the integrated RFID tag reader and the associated software of the mobile communication device can disengage from the driving lock safety feature for the mobile communication device, as shown in STEP 906. The vehicle interior zone-based prevention of a dangerous user behavior with a mobile communication device using an integrated RFID reader and embedded RFID tags in a vehicle, as shown in this embodiment of the invention, uniquely provides real-time enablement and disablement of the driving lock, depending on a current position of the mobile communication device within the vehicle's interior. The authority of enabling or disabling the driving lock may be given to the supervising entity or the mobile communication device user himself or herself, depending on a particular implementation of an embodiment of the present invention.

Figure 10:
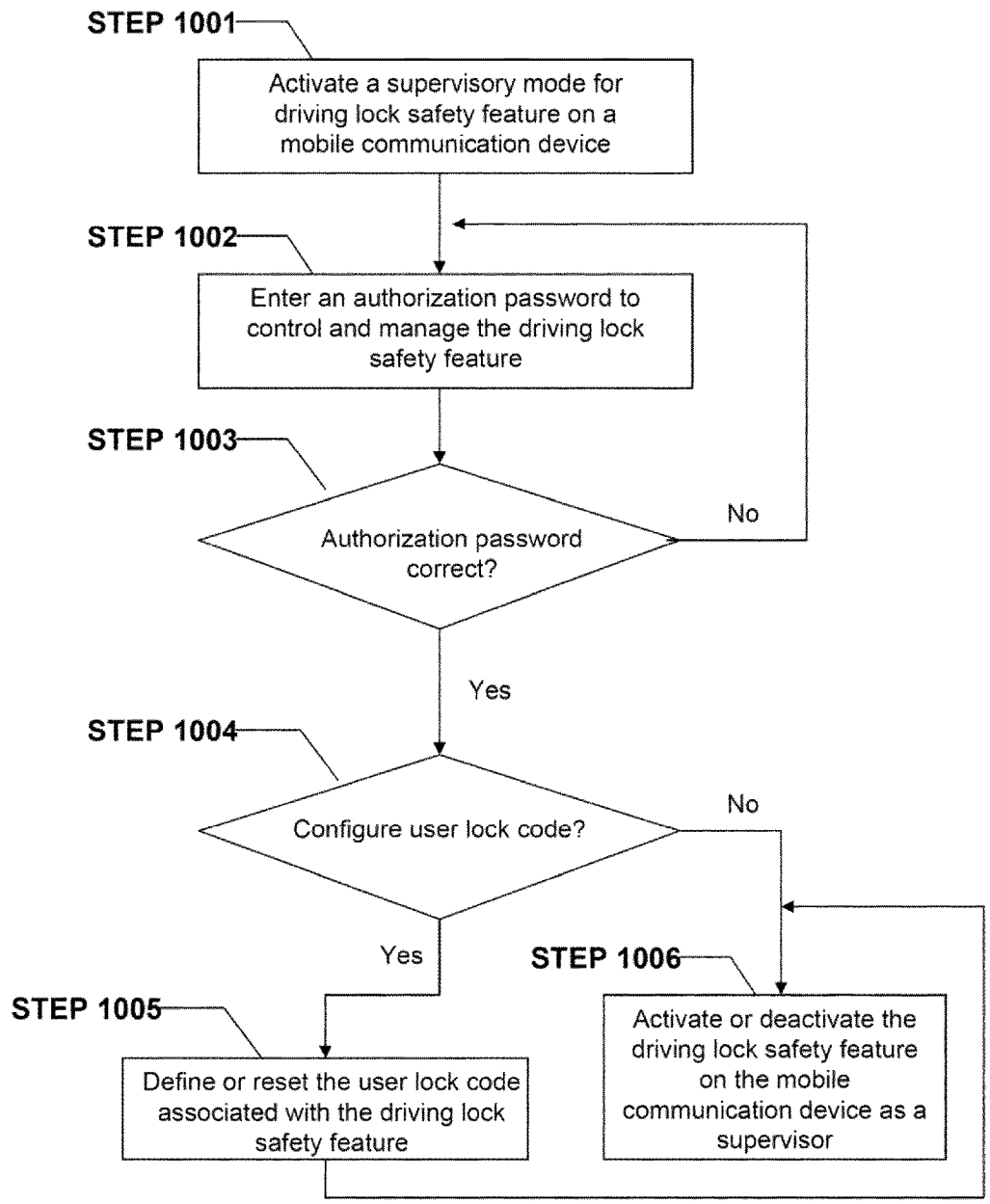
FIG. 10 shows a flowchart for a method of authorizing and authenticating a supervisory mode for driving lock safety feature on a mobile communication device, in accordance with an embodiment of the invention.

FIG. 10 shows a flowchart (1000) for a method of authorizing and authenticating a supervisory mode for driving lock safety feature on a mobile communication device, in accordance with an embodiment of the invention. In a preferred embodiment of the invention, a supervising entity, such as a parent to a child, or an employer to an employee, can activate a supervisory mode for a driving lock safety feature on a mobile communication device, as shown in STEP 1001. In the preferred embodiment of the invention, the activation of the supervisory mode is performed on a touch screen interface, a physical key interface, or a computer interface, wherein the supervisory mode is at least partially operated by a software executed on a CPU and a memory unit of the mobile communication device, wherein this software is associated with an RFID tag reader integrated in the mobile communication device. In one embodiment of the invention, the supervisory mode is also partially operated by a computer server or another electronic device operatively connected to the mobile communication device for data and/or voice communication, wherein the computer server or the other electronic device may execute another software in its CPU and its memory unit for supervisory and remote management and control of the mobile communication device.

Once the supervisory mode for the driving lock safety feature is activated in STEP 1001, the supervising entity is asked to enter an authorization password to control and manage the driving lock safety feature, as shown in STEP 1002. This step ensures that only an authorized entity that is validated as the supervising entity can define, enable, disable, control, and manage the driving lock safety feature for the mobile communication device. If the authorization password is incorrect, then the supervising entity is asked to re-enter the password until the password is validated, as shown in STEP 1003. On the other hand, if the authorization password is correct, then the supervising entity is asked to configure a user lock code, as shown in STEP 1004. In one embodiment of the invention, the user lock code is a password that the mobile communication device user has to enter to take control or override the supervisory mode for the driving lock safety feature on the mobile communication device. The supervising entity may want to set up the user lock code, so that a qualified mobile communication device user can override the supervisory mode for certain situations, while preventing at least some users from altering the mobile communication device for the driving lock safety feature.

Continuing with FIG. 10, if the supervising entity does not want to set up and configure the user lock code, then the supervising entity can proceed to activate or deactivate the driving lock safety feature on the mobile communication device as a supervisor, as shown in STEP 1006. On the other hand, if the supervising entity wants to set up and configure the user lock code, then the supervising entity can define or reset the user lock code associated with the driving lock safety feature, as shown in STEP 1005, and then proceed to STEP 1006 for activating or deactivating the driving lock safety feature on the mobile communication device as the supervisor.

The present invention in various embodiments as described for FIGS. 1~10 provides several advantages to mobile communication device users and supervising entities to the mobile communication device users. In particular, one or more embodiments of the present invention can prevent, prohibit, and/or limit a user from performing a dangerous user behavior such as driving while using a mobile communication device, thereby reducing user distraction to improve both the user safety and the public safety in public roads. Furthermore, one or more embodiments of the present invention can calibrate, define, and/or determine what a "driving lock" zone is within a vehicle's interior space, so that passengers in the vehicle are not automatically inconvenienced with their mobile communication devices by virtue of being in the same vehicle.

Moreover, by embedding an RFID tag inside a vehicle to define a particular vehicle interior zone, which is recognizable by an integrated RFID tag reader such as an NFC chipset or another RFID chipset in a mobile communication device, various embodiments of the present invention disclose a novel apparatus and a related novel method to prevent a dangerous user behavior with a mobile communication device while driving. In addition, by providing an apparatus and a method to authenticate and authorize a supervising entity to enable or disable certain device features while a mobile communication device user is driving or performing another attention-requiring activity, one or more embodiments of the present invention enable dynamic enforcement or compliance for certain safety guidelines against one or more supervised mobile communication device users by the supervising entity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for vehicle interior zone-based prevention of a dangerous user behavior with a mobile communication device, the apparatus comprising:
    an RFID tag embedded in a vehicle's interior space, wherein a tag readable range of the RFID tag defines a driving lock zone in the vehicle's interior space;
    an integrated RFID tag reader in the mobile communication device, wherein the integrated RFID tag reader is configured to interrogate, read from, or write to a non-volatile memory storage unit inside the RFID tag;
    a CPU connected to the integrated RFID tag reader inside a casing of the mobile communication device;
    a memory unit connected to the CPU and also operatively connected to the integrated RFID tag reader; and
    a software program executed on the CPU and the memory unit of the mobile communication device, wherein the software program generates a user safety feature list menu for prevention of dangerous user behavior on a touch screen, wherein the user safety feature list menu comprises a driving lock on and off switch, a location tracking and driving lock mixed-mode switch, and a "driving lock options" sub-menu incorporating at least one of a "disable typing function" switch, a "disable web browser" switch, and a "disable camera" switch, and wherein the software program also retrieves a code from the RFID tag utilizing the integrated RFID tag reader, and then compares the code against a known set of information separately accessible by the mobile communication device to determine whether the code from the RFID tag represents the driving lock zone for the mobile communication device;
    when the code retrieved from the RFID tag indicates that the code is representing the driving lock zone and when the vehicle is moving while the location tracking and driving lock mixed-mode switch is engaged, the software program disables at least one of a typing function, a web browser, and a camera on the mobile communication device in accordance with a user setting in the "driving lock options" sub-menu provided by the software program executed on the CPU and the memory unit of the mobile communication device;
    else when the code retrieved from the RFID tag indicates that the code is representing the driving lock zone, but the vehicle is stationary while the location tracking and driving lock mixed-mode switch is engaged, the software program enables all of the typing function, the web browser, and the camera on the mobile communication device;
    else when the code retrieved from the RFID tag indicates that the code is representing the driving lock zone while the location tracking and driving lock mixed-mode switch is disengaged, the software program disables at least one of the typing function, the web browser, and the camera on the mobile communication device in accordance with the user setting in the "driving lock options" sub-menu; and
    else when the code retrieved from the RFID tag indicates something other than the driving lock zone, the software program maintains or activates all of the typing function, the web browser, and the camera on the mobile communication device.

2. The apparatus of claim 1, wherein the software program is also configured to prevent, prohibit, and/or limit usage of one or more functions associated with the mobile communication by enabling or activating a driving lock, if the mobile communication device is determined to be inside the driving lock zone of the vehicle's interior space.

3. The apparatus of claim 1, further comprising one or more additional RFID tags, wherein each of the one or more additional RFID tags define a front passenger zone, a rear passenger zone, or another zone for the vehicle's interior space.

4. The apparatus of claim 1, wherein the integrated RFID tag reader is an NFC tag reader, and the RFID tag is an NFC tag.

5. The apparatus of claim 1, wherein the integrated RFID tag reader is a UHF tag reader or an LF tag reader, and the RFID tag is a UHF RFID tag or an LF RFID tag.

6. The apparatus of claim 1, wherein the RFID tag embedded in the vehicle's interior space is a passive tag, which does not include any internal power source within the RFID tag.

7. The apparatus of claim 1, further comprising a graphics unit operatively connected to the CPU, and a display unit operatively connected to the graphics unit, wherein the display unit provides a touch-screen user interface to display a user safety feature list, driving lock options, driving lock zone status, driving lock status, and/or a user lock code entry interface.

8. The apparatus of claim 1, further comprising a camera processing unit, a digital signal processing unit, and a power management unit inside the mobile communication device, wherein the power management unit is operatively connected to a power source.

9. The apparatus of claim 2, further comprising a GPS signal receiver unit configured to provide real-time location tracking information to the software program for more accurate determination of enabling the driving lock.

10. The apparatus of claim 2, wherein the driving lock is disabled to allow the one or more functions associated with the mobile communication device to be accessed or used by a mobile communication device user, if the software program determines that the mobile communication device is inside the driving lock zone of the vehicle's interior space.

11. The apparatus of claim 8, wherein the software program also provides a driving lock options menu for the driving lock options on the touch-screen user interface.

12. The apparatus of claim 11, wherein the driving lock options menu includes a menu to disable typing functions, a menu to disable a web browser, and a menu to disable a camera as part of the driving lock options.

13. A method for preventing a dangerous user behavior with a mobile communication device in a vehicle's interior space, the method comprising the steps of:

turning the mobile communication device on;

generating a user safety feature list menu for prevention of dangerous user behavior on a touch screen with a software program executed on a CPU and a memory unit of the mobile communication device, wherein the user safety feature list menu comprises a driving lock on and off switch, a location tracking and driving lock mixed-mode switch, and a "driving lock options" sub-menu incorporating at least one of a "disable typing function" switch, a "disable web browser" switch, and a "disable camera" switch;

turning a driving lock on in the mobile communication device by controlling the driving lock on and off switch:

interrogating an RFID tag embedded in the vehicle's interior space with an RFID tag reader integrated in the mobile communication device, wherein a tag readable range of the RFID tag defines a driving lock zone in the vehicle's interior space;

when a code retrieved from the RFID tag indicates that the code is representing the driving lock zone and when the vehicle is moving while the location tracking and driving lock mixed-mode switch is engaged, disabling at least one of a typing function, a web browser, and a camera on the mobile communication device in accordance with a user setting in the "driving lock options" provided by the software program executed on the CPU and the memory unit of the mobile communication device;

else when the code retrieved from the RFID tag indicates that the code is representing the driving lock zone, but the vehicle is stationary while the location tracking and driving lock mixed-mode switch is engaged, enabling all of the typing function, the web browser, and the camera on the mobile communication device:

else when the code retrieved from the RFID tag indicates that the code is representing the driving lock zone while the location tracking and driving lock mixed-mode switch is disengaged, disabling at least one of the typing function, the web browser, and the camera on the mobile communication device in accordance with the user setting in the "driving lock options" sub-menu; and else when the code retrieved from the RFID tag indicates something other than the driving lock zone, maintaining or activating all of the typing function, the web browser, and the camera on the mobile communication device.

14. The method of claim 13, further comprising a step of checking whether the driving lock is still turned on.

15. The method of claim 14, further comprising a step of looping back to the step of interrogating the RFID tag embedded in the vehicle's interior space with the RFID tag reader integrated in the mobile communication device, if the step of checking whether the driving lock is still turned on indicates that the driving lock is still turned on.

16. The method of claim 14, further comprising a step of disengaging from the driving lock, if the step of checking whether the driving lock is still turned on indicates that the driving lock is turned off.

* * * * *